(12) United States Patent
Zhu

(10) Patent No.: US 12,205,424 B1
(45) Date of Patent: Jan. 21, 2025

(54) SYSTEMS AND METHODS FOR MANAGING DOOR ACCESS USING MOVEMENT AND POSE

(71) Applicant: Yuanji Zhu, Luoyang (CN)

(72) Inventor: Yuanji Zhu, Luoyang (CN)

( * ) Notice: Subject to any disclaimer, the term of this patent is extended or adjusted under 35 U.S.C. 154(b) by 0 days.

(21) Appl. No.: 18/631,159

(22) Filed: Apr. 10, 2024

(51) Int. Cl.
*G07C 9/00* (2020.01)
*H04L 12/66* (2006.01)
*B60W 50/00* (2006.01)

(52) U.S. Cl.
CPC . *G07C 9/00563* (2013.01); *B60W 2050/0022* (2013.01); *B60W 2540/047* (2020.02)

(58) Field of Classification Search
CPC .............. H04L 47/6275; H04L 63/0853; H04L 63/0892; H04L 69/18; H04L 12/66; H04L 67/10; H04L 67/12; H04L 67/51; H04B 17/318; G07G 1/06; G06V 40/172; G06V 40/28; G06Q 20/0655; G06Q 20/3672; G06Q 20/3676; G06Q 20/3678; G06Q 20/4033; G06Q 20/405; G05D 1/0011; G05D 1/221; E05F 15/73; E05F 15/77; B60R 16/037; B60N 2/002; B60K 2360/111; B60K 2360/143; B60K 2360/145; B60K 35/00; B60K 35/10; G07C 2209/63; G07C 9/00309; G07C 9/257; G07C 2009/00412; G07C 2009/00769; G07C 9/00182; G07C 9/00563; G07C 9/00571; G07C 9/20; G07C 9/25; G07C 9/27; G07C 9/28; G06F 3/017; G06F 1/163; G06F 1/1694; G06F 3/011; G06F 3/014; G06F 3/0202; G06F 3/0227; G06F 3/023; B60W 2050/0083; B60W 50/0098; B60W 2556/45; B60W 30/00; B60W 50/08; B60W 2050/0022; B60W 2420/403; B60W 2420/54; B60W 2540/043; B60W 2540/047; B60W 2540/227; B60W 2556/10; B60W 40/08; B60W 60/00; B60W 60/0013; H04W 4/80; H04W 12/08; H04W 12/06; H04W 12/33; H04W 12/68; H04W 28/0925; H04W 4/12; H04W 4/40; H04W 72/0446; H04W 72/1215; H04W 72/1263;
(Continued)

(56) References Cited

U.S. PATENT DOCUMENTS

| | | | | |
|---|---|---|---|---|
| 2015/0097651 | A1* | 4/2015 | Clough | G07C 9/00182 340/5.7 |
| 2019/0053259 | A1* | 2/2019 | Kandhalu Raghu | H04W 72/569 |
| 2019/0289082 | A1* | 9/2019 | Furuichi | H04L 12/66 |

(Continued)

*Primary Examiner* — Dionne Pendleton
(74) *Attorney, Agent, or Firm* — Clayton, McKay & Bailey, PC

(57) ABSTRACT

Described herein are examples of non-contact systems and methods for managing door access. In an example, a door access device can comprise an array of sensors for detecting one or more movements or poses of an individual in proximity to a door. The device can have a first array of sensors located on a first side of the door associated with a first priority, and a second array of sensors located on a second side of the door associated with a second priority lower than the first priority. In use, requests associated with movements or poses detected by the first array of sensors can be given priority over requests associated with movements or poses detected by the second array of sensors.

20 Claims, 18 Drawing Sheets

(58) Field of Classification Search
CPC ..... H04W 72/569; H04W 80/00; H04W 4/70; G06N 20/00; G06N 3/08
See application file for complete search history.

(56) References Cited

U.S. PATENT DOCUMENTS

| | | | |
|---|---|---|---|
| 2021/0118255 A1* | 4/2021 | Tiwari | G06V 40/28 |
| 2022/0230498 A1* | 7/2022 | Prevost | G07C 9/00571 |
| 2022/0235595 A1* | 7/2022 | Dreyer | E05F 15/73 |
| 2023/0202490 A1* | 6/2023 | Marzorati | B60W 60/00 701/36 |

* cited by examiner

SYSTEMS AND METHODS FOR MANAGING DOOR ACCESS USING MOVEMENT AND POSE

BACKGROUND

In public facilities, the transmission of bacteria and viruses through door lock or knob contact is a significant concern for public health. Studies have shown that door locks and knobs can harbor a variety of pathogens, including bacteria such as Staphylococcus aureus, Escherichia coli, and viruses like influenza and rhinovirus. Such viruses and bacteria can survive on surfaces like doorknobs for varying amounts of time, depending on factors such as temperature, humidity, and the specific microorganism involved.

When individuals touch these surfaces, they can easily transfer these pathogens to their hands. Subsequent contact with the face, mouth, or eyes can lead to the introduction of these pathogens into the body, increasing the risk of infection. Furthermore, individuals can inadvertently spread these pathogens to other surfaces and individuals with which they come into contact.

To minimize the risk of infection from touching doorknobs or other commonly touched surfaces, medical professionals stress the importance of practicing good hand hygiene. This can include washing one's hands frequently with soap and water for at least 20 seconds, especially after touching potentially contaminated surfaces, and using hand sanitizer containing at least 60% alcohol when soap and water are not readily available. Additionally, medical professionals recommend avoiding touching one's face, especially one's eyes, nose, and mouth, to help reduce the risk of transferring infectious agents from one's hands to one's mucous membranes.

However, it is not always practical to ask individuals to wash their hands as frequently as may be required to avoid any instance of a pathogen being transferred from a doorknob or other commonly touched surface to an individual's hand and then to the individual's mucous membranes. For example, there may be limited access to washing stations and/or the navigation of a facility may require contact with a large number of doorknobs and similar surfaces.

Given the high traffic and frequent use of door locks and knobs in public facilities, the risk of bacterial and viral transmission through these surfaces is heightened. As a result, a need exists for improved systems and methods for avoiding the transmission of pathogens in high traffic locations, as well as a need for improved systems and methods for unlocking and/or opening doors and passages in such locations.

SUMMARY

The present disclosure describes novel, non-contact systems and methods for managing door access using movement and pose. Applying the systems and methods described herein to the doors of public rooms, shopping mall, or hospitals, as examples, can greatly reduce the risk of bacterial and/or viral transmission through door lock/knob contact.

In one aspect, the systems described here can detect an individual's movement, pose, and/or other postures. For example, the systems can analyze a pattern or series of movements by an individual. In a further aspect, the systems can translate the individual's movements into numbers, symbols, or commands. In another aspect, the systems can send signals to, or otherwise control, access through a door or passageway, such as lock/unlock and open/close commands to a door. In a further illustrative example, the systems can send signals to, or otherwise control, other valves, faucets, lights, sounds, motors, or thermostats which would otherwise require contact.

In some examples, the systems can detect movement or pose of an individual from approximately 1000 mm away. In other examples, the systems can detect the individual's movement or pose from shorter or greater distances.

In one embodiment, the systems can set a same priority for both sides of a door. For example, a door can unlock upon detecting an unlock request from either side of the door, disregarding whether the previous lock request was detected from the opposite side of the door.

In another embodiment, the systems can set different priorities for the two sides of a door. For example, in an instance where a door is locked from a side of the door assigned with a relatively higher priority, the door will not unlock upon detecting an unlock request from the other side of the door assigned with a relatively lower priority.

In further embodiments, the systems can assign different priority levels to different detected movements and poses.

In other examples, the systems can support the recording of customized movements and/or poses. For example, the systems can record an individual performing a particular movement or pose, and save associated information for later detection and use.

In another example, the systems can record a pattern associated with an individual's movement or poses. In some embodiments, the systems can record a thermal change pattern associated with an individual's hand movement. In a further illustrative example, the systems can compare a saved recording of a prior movement or pose with a subsequent detection of a future movement or pose. Where the subsequently detected movement or pose substantially matches the recorded movement or pose, a customized reaction (e.g., unlocking a door) can be performed.

Both the foregoing general description and the following detailed description are exemplary and explanatory only and are not restrictive of the examples, as claimed.

BRIEF DESCRIPTION OF THE DRAWINGS

The accompanying drawings, which are incorporated in and constitute a part of this disclosure, illustrate various embodiments and aspects of the present disclosure. In the drawings.

DESCRIPTION OF THE EXAMPLES

Reference will now be made in detail to the present examples, including examples illustrated in the accompanying drawings. Wherever possible, the same reference numbers will be used throughout the drawings to refer to the same or like parts. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

It should be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the disclosure and the claims.

The present disclosure is to be considered as an exemplification of the systems and methods described here and is not intended to limit the systems and methods to the specific embodiments illustrated by the figures or described below.

Figure 1:
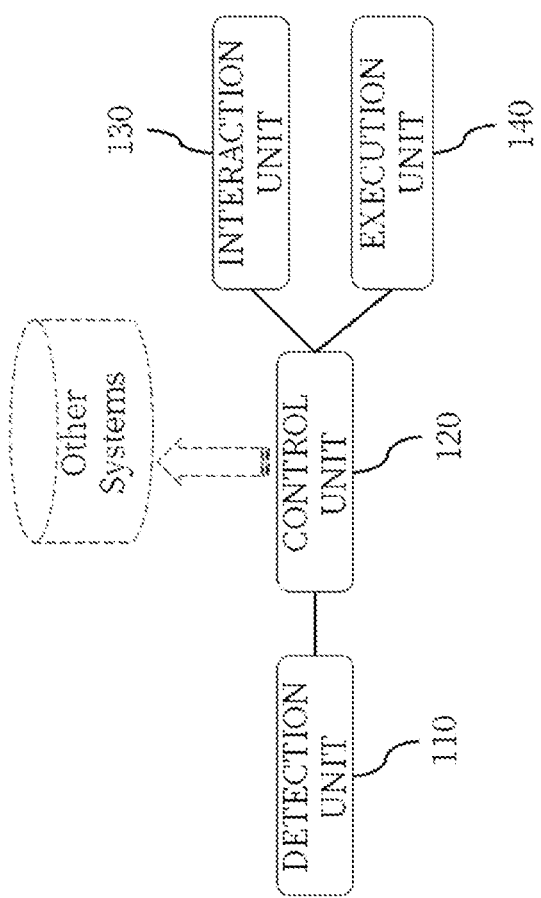
FIG. 1 is an illustration of example hardware components comprising an access management system in accordance with this disclosure.

FIG. 1 depicts a diagram of an illustrative door access management system. In one embodiment, a detection unit 110 can detect access requests of a user. Control unit 120 can process requests detected by detection unit 110. Control unit 120 can exchange information and/or send signals to detection unit 110, interaction unit 130, execution unit 140, and other systems. Interaction unit 130 can interact with user. Execution unit 140 can comprise execution devices, such as one or more lockers and/or door opening mechanisms. Execution unit 140 can also send signals to other lockers, door opening mechanisms, valves, and/or switches.

Figure 2:
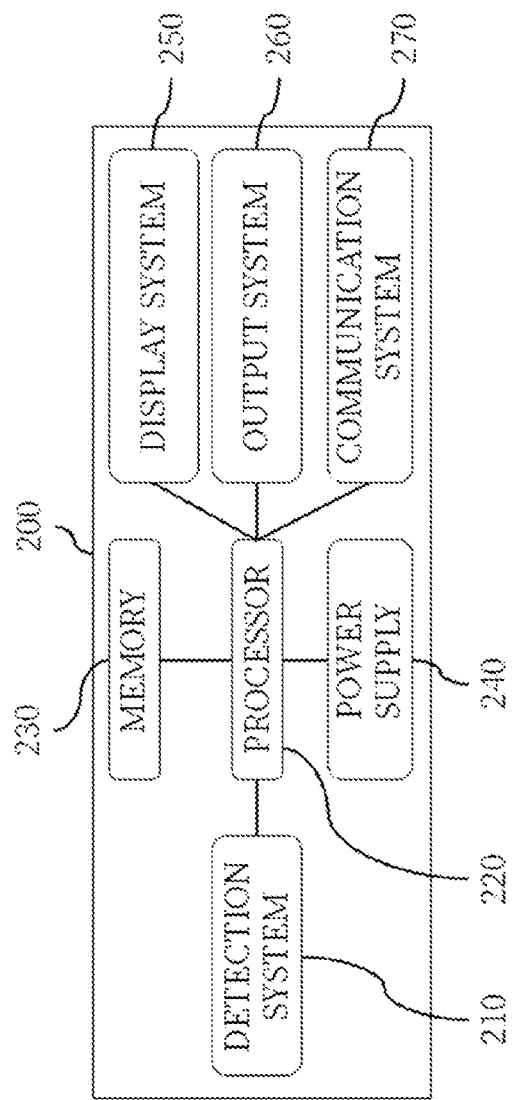
FIG. 2 is an illustration of example hardware components comprising a detection unit in accordance with this disclosure.

FIG. 2 depicts a diagram of an illustrative detection unit 200. In one embodiment, detection unit 200 can comprise a detection system 210, a processor 220, a memory 230, a power supply 240, a display system 250, an output system 260, and a communication system 270. Detection system 210 can comprise different types of sensors to detect different properties, such as movement, pose, temperature, or geometry of an object or individual. In some examples, detection system 210 can comprise one or more laser generators, laser detectors, lenses, light sensitive materials, heat-sensitive materials, acoustic generators, electromagnetic sensitive materials, and sound wave receivers, etc. Processor 220 can, in some embodiments, exchange information with memory 230, and process the information into useful references for display system 250 and output system 260. In some embodiments, power supply 240 can comprise power adapters and batteries. In further embodiments, display system 250 can comprise lights, indicators, and interfaces. In another aspect, output system 260 can comprise relays or pulse generators. Communication system 270 can comprise WIFI, Bluetooth, or other types of wireless modules, in some examples. In other embodiments, communication system 270 can further or alternatively comprise wired communication methods.

Figure 3:
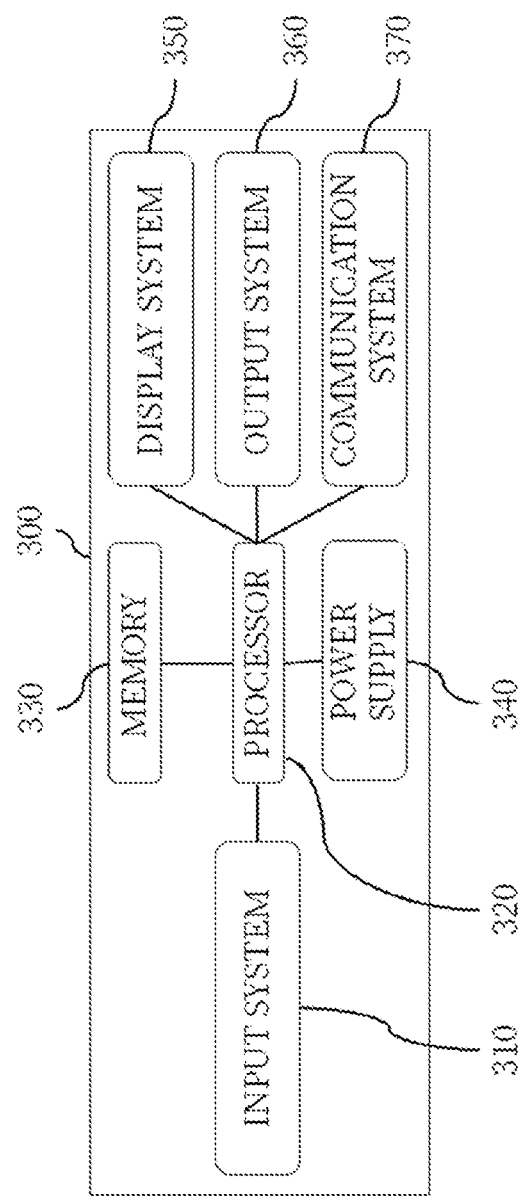
FIG. 3 is an illustration of example hardware components comprising a control unit in accordance with this disclosure.

FIG. 3 depicts a diagram of an illustrative control unit 300. In one embodiment, control unit 300 can comprise an input system 310, a processor 320, a memory 330, a power supply 340, a display system 350, an output system 360, and a communication system 370. Input system 310 can comprise one or more different types of circuits for receiving signals from detection unit 200, interaction unit 400, execution unit 500, and other systems. Processor 320 can exchange information with memory 330, and process the information into useful references for display system 350, output system 360, and communication system 370, in some examples. In another aspect, power supply 340 can comprise power adapters and batteries. Display system 350 can comprise lights, indicators, and interfaces, in some examples. In further examples, output system 360 can comprise relays or pulse generators, etc. Communication system 370 can comprise WIFI, Bluetooth, or other types of wireless modules, in some examples. In other embodiments, communication system 370 can further or alternatively comprise wired communication methods.

Figure 4:
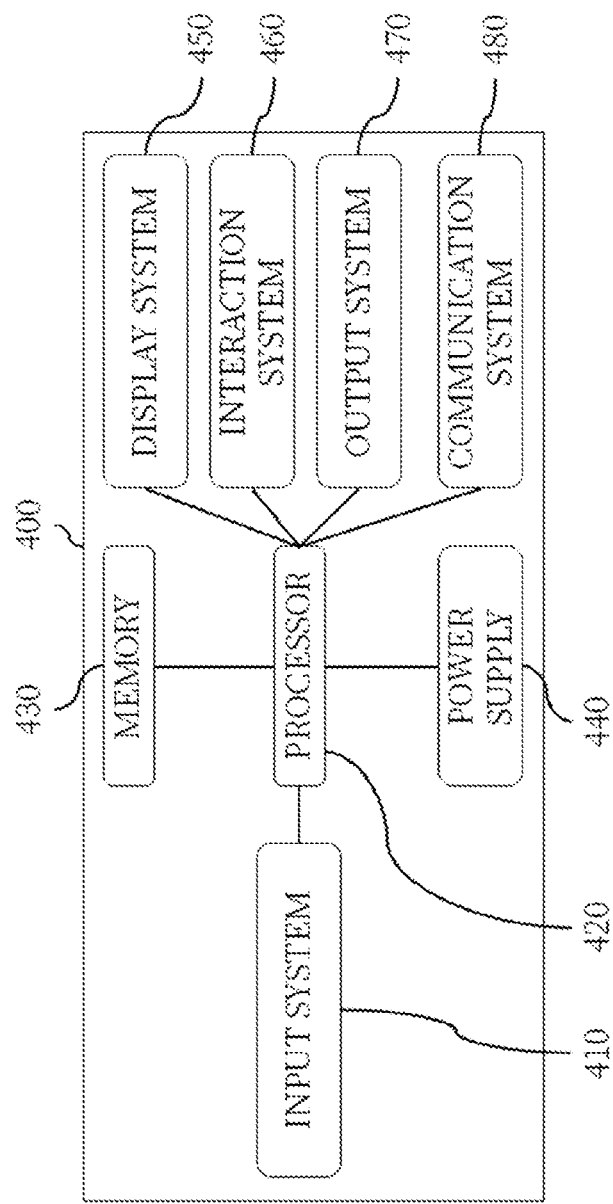
FIG. 4 is an illustration of example hardware components comprising an interaction unit in accordance with this disclosure.

FIG. 4 depicts a diagram of an illustrative interaction unit 400. In some embodiments, interaction unit 400 can comprise an input system 410, a processor 420, a memory 430, a power supply 440, a display system 450, an interaction system 460, an output system 470, and a communication system 480. In one aspect, input system 410 can comprise different types of circuits for receiving signals from control unit 300. In another aspect, processor 420 can exchange information with memory 430, and process the information into useful references for display system 450, interact system 460, and output system 470. In a further aspect, power supply 440 can comprise power adapters and batteries. Display system 450 can comprise lights, indicators, and interfaces, in some examples. In another aspect, interact system 460 can comprise touch screens, buttons, speakers, and microphones, etc. In a further aspect, output system 470 can comprise relays, or pulse generators, etc. Communication system 480 may comprise WIFI, Bluetooth, or other types of wireless modules, in some examples. In other embodiments, communication system 480 can further or alternatively comprise wired communication methods.

Figure 5:
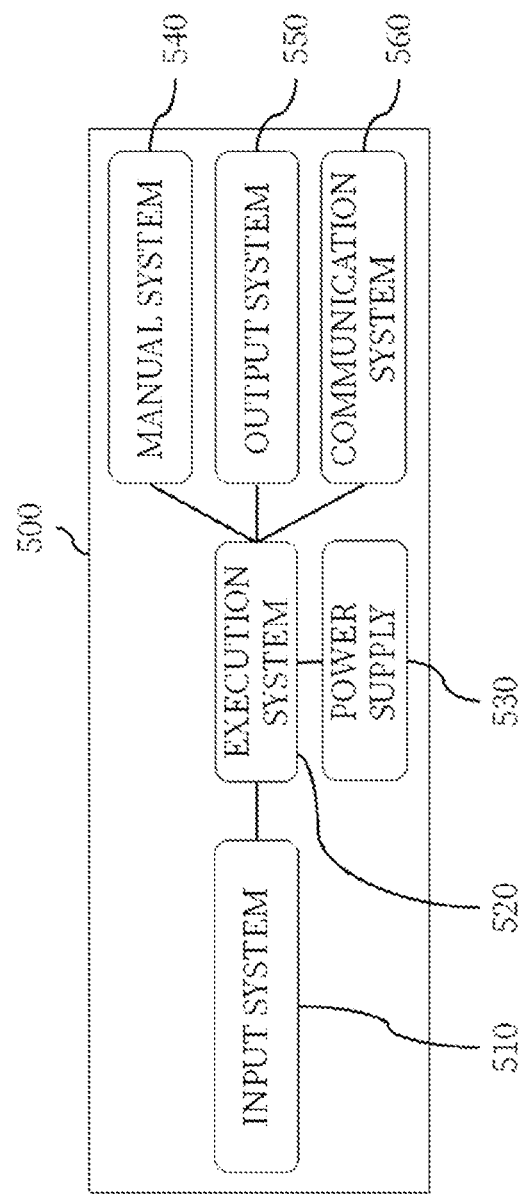
FIG. 5 is an illustration of example hardware components comprising an execution unit in accordance with this disclosure.

FIG. 5 depicts a diagram of an illustrative execution unit 500. In some embodiments, execution unit 500 can comprise an input system 510, an execution system 520, a power supply 530, a manual system 540, an output system 550, and a communication system 560. In one aspect, input system 510 can comprise different types of circuits for receiving signals from control unit 300. In another aspect, execution system 520 can perform locking/unlocking and/or opening/closing of a door, valve, or switch. In a further aspect, power supply 530 can comprise power adapters, and batteries. Manual system 540 can allow user to manually control execution system 520, in some examples. In further examples, output system 550 can comprise relays, or pulse generators, etc. In another aspect, communication system 560 can comprise WIFI, Bluetooth, or other types of wireless modules. In other embodiments, communication system 560 can further or alternatively comprise wired communication methods.

Figure 6:
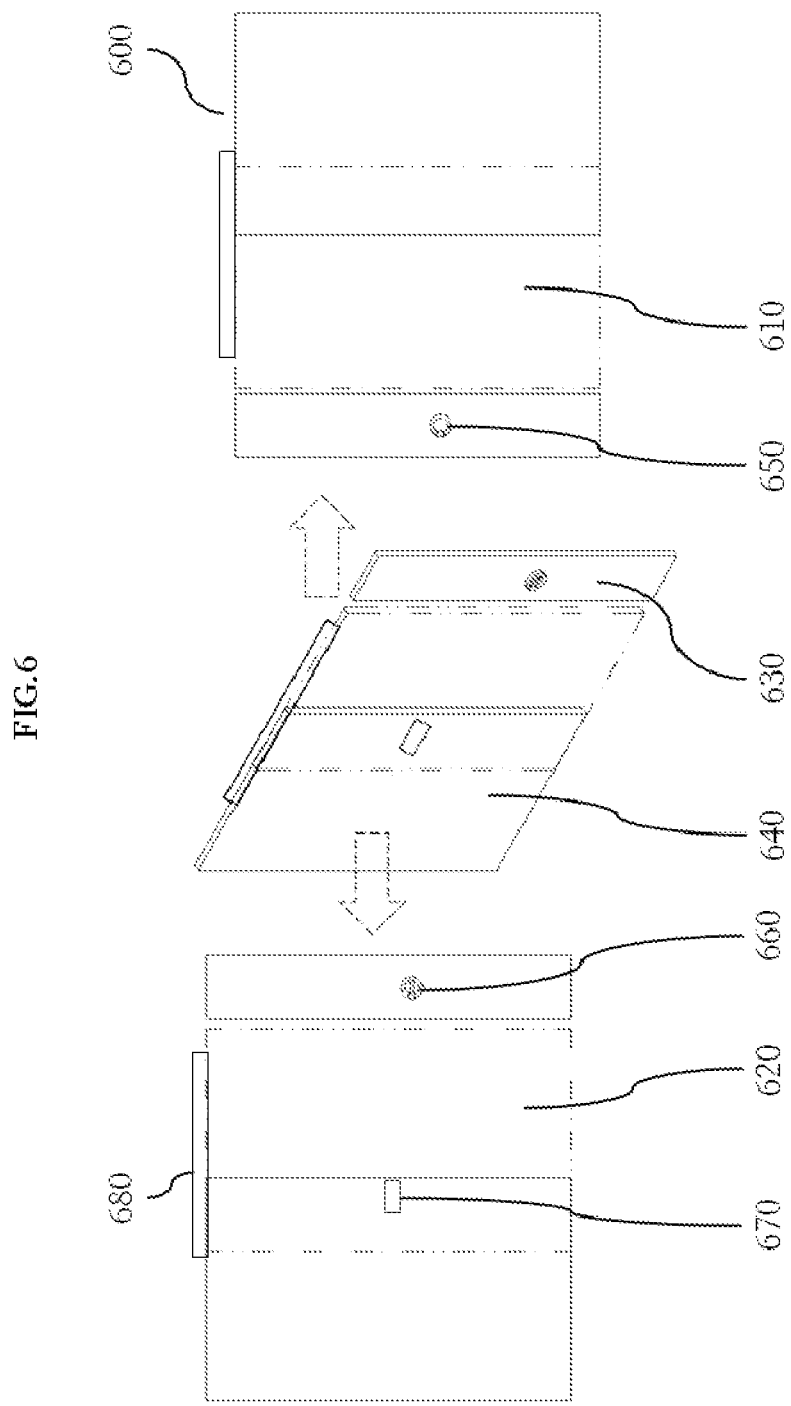
FIG. 6 is an illustration of example components of a door access control system in accordance with this disclosure.

FIG. 6 depicts illustrative components for a door access management system 650 and door 600. In one aspect, the management system 650/660 can control door 600 so as to open or close the door, or lock or unlock the door. In another aspect, the management system 650/660 can further control the lights in a room (e.g., turning lights on/off), valves in a room (e.g., opening/closing the valves), and other suitable automatic devices/systems. In a further aspect, the management system 650/660 can be provided in any suitable shapes or geometries. In one illustrative example, on low priority side 610 of door 600, the door access management system 650 (i.e., the portion of the management system engageable from side 610 of door 600) can control a door opening mechanism 680, valves in the room (not shown in drawing), and switches in the room (not shown in drawing). In another aspect, on high priority side 620 of door 600, the door access management system 660 (i.e., the portion of the management system engageable from side 620 of door 600) can control the door opening mechanism 680, a door locker 670, valves in the room (not shown in drawing), and switches in the room (not shown in drawing).

In another embodiment, the door access management system 650/660 can be coupled or otherwise anchored to opposing sides of non-moving portion 630 of a building or door frame. Of course, the management system can also be placed at any suitable location for any reasonable managing purpose. For example, to prevent a crowded waiting line blocking entrance to or exit from a room, the present invention for low priority side may be placed on a wall away from the room. The management system 650 for low priority side 610 of door 600 can use WIFI, infrared pulse signal, or any other suitable signals to communicate to a target for controlling door access. Similarly, management system 660 on high priority side 620 of door 600 can also be placed at any suitable location in a room. In another aspect, for convenient purpose, the room can further include a second management system 650/660 in any suitable shape/geometry for controlling a toilet flushing and toilet cover lifting up/down.

Figure 7:
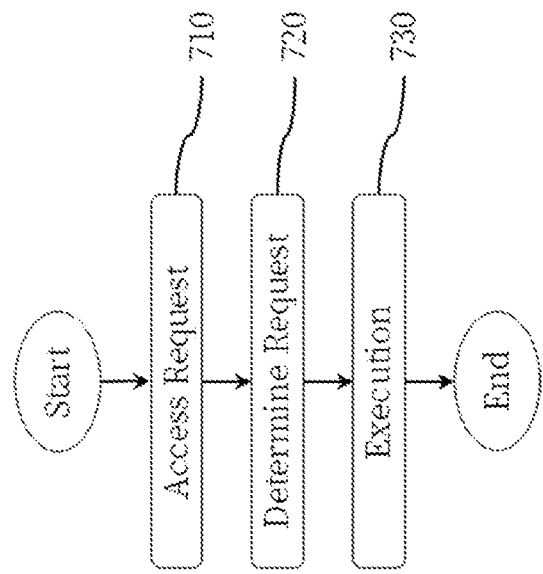
FIG. 7 is a flowchart depicting steps in an example process for managing door access in accordance with this disclosure.

FIG. 7 depicts a flowchart of an illustrative method for managing door access. In some embodiments, a user can initiate the process by making an access request at step 710. The management system can interpret the request at step 720. At step 730, the system can execute one or more actions based on step 720.

Figure 8:
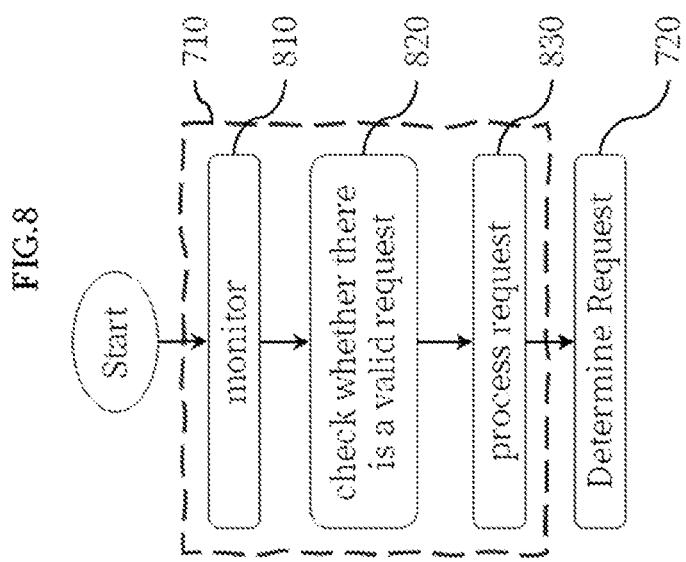
FIG. 8 is a flowchart depicting steps in an example process for managing door access in accordance with this disclosure.

FIG. 8 depicts a flowchart for describing some embodiments of step 710 of FIG. 7 in more detail. In some examples, at step 810, an individual's movement or pose that is in proximity to the management system can be detected and monitored. At step 820, the management system can interpret the movement or pose as a request to perform a function and check whether the user's request is valid. At step 820, in further examples, multiple types of detectors can be used to ensure accurate interpretation of the individual's movement or pose. At step 830, after a valid request has been detected, the management system can process the request. For example, at step 830, once an unlock request has been detected, the detection unit 110 in FIG. 1 can send a signal to control unit 120 in FIG. 1 to initiate an unlock action.

Figure 9:
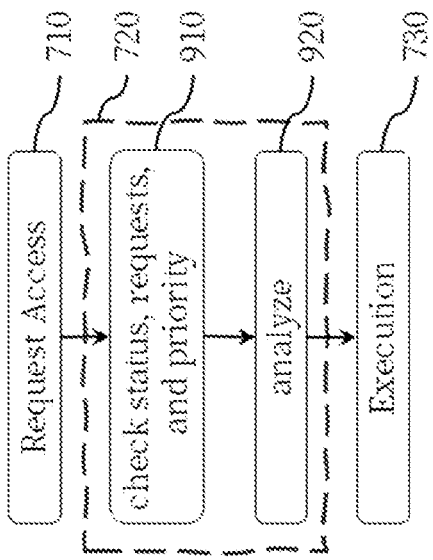
FIG. 9 is a flowchart depicting steps in an example process for managing door access in accordance with this disclosure.

FIG. 9 depicts a flowchart for describing some embodiments of step 720 of FIG. 7 in more detail. In some examples, at step 910, control unit 120 in FIG. 1 can check the current door status (open/close or locked/unlocked), one or more user requests, and a priority for each request. At step 920, the control system 120 in FIG. 1 can analyze all information. For example, in step 920, the control unit 120 in FIG. 1 can compare a priority of a new request with a priority of a prior request.

Figure 10:
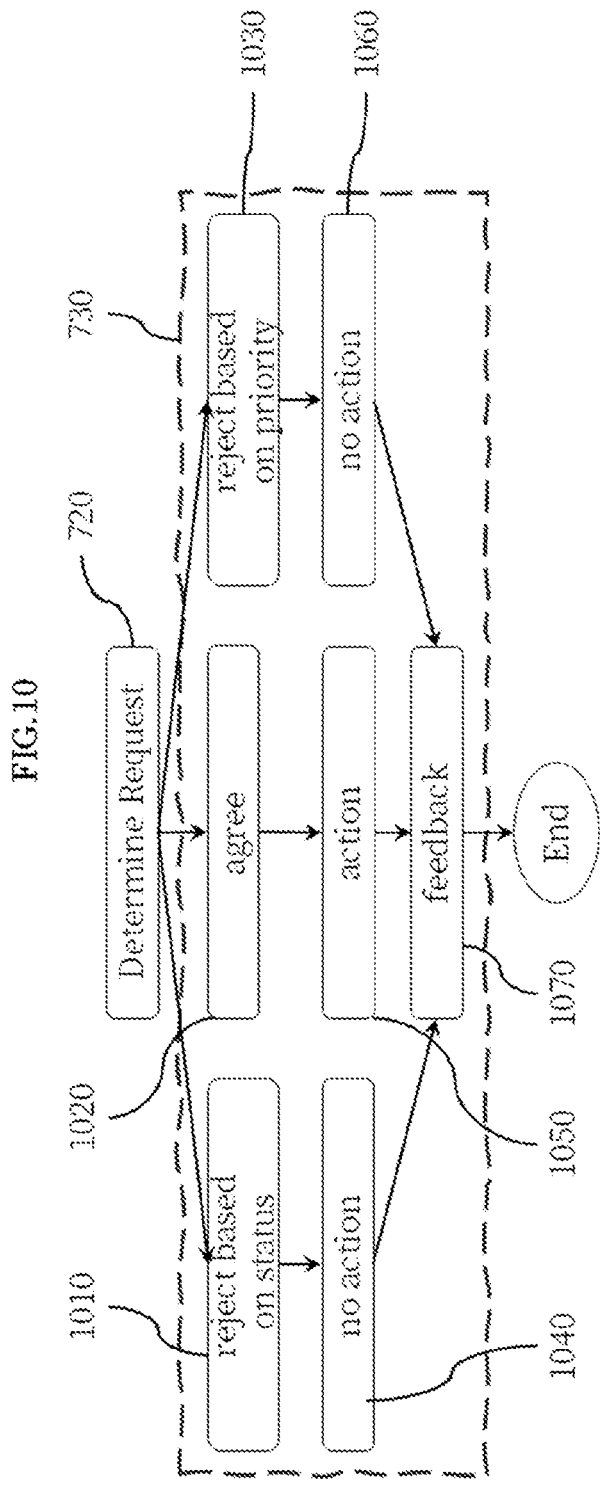
FIG. 10 is a flowchart depicting steps in an example process for managing door access in accordance with this disclosure.

FIG. 10 depicts a flowchart for describing some embodiments of step 730 of FIG. 7 in more detail. In some examples, at step 1010, control unit 120 in FIG. 1 can reject a new request based on a current status. For example, if the door is currently at an unlock status, a new request to unlock the door may result in step 1010 (rejection based on current status). Following step 1010, at step 1040 and based on the rejection, no action will be taken. At step 1070, feedback can be provided to a user through interaction unit 130 in FIG. 1.

In another aspect, at step 1020, control unit 120 in FIG. 1 can accept a new request after checking or analyzing a current status. For one example, if the door is currently at an unlock status, a new request to lock the door at the side with relatively higher priority can result in step 1020. Following step 1020, at step 1050, the management system can perform the requested action (e.g., lock/unlock or open/close the door). In alternative or further examples, at step 1050, the management system can also control other appliances, such as flushing a toilet or activate a sterilization/disinfectant device. At step 1070, feedback can be provided to a user through interaction unit 130 in FIG. 1.

In a further aspect, at step 1030, control unit 120 in FIG. 1 can reject a new request based on priority. For example, if the door is currently at a lock status as requested at the side with relatively higher priority, a new request to unlock the door at the side with relatively lower priority may result in a rejection of the request at step 1030. Following step 1030, at step 1060, no action can be taken. At step 1070, feedback can be provided to a user through interaction unit 130 in FIG. 1.

Figure 11:
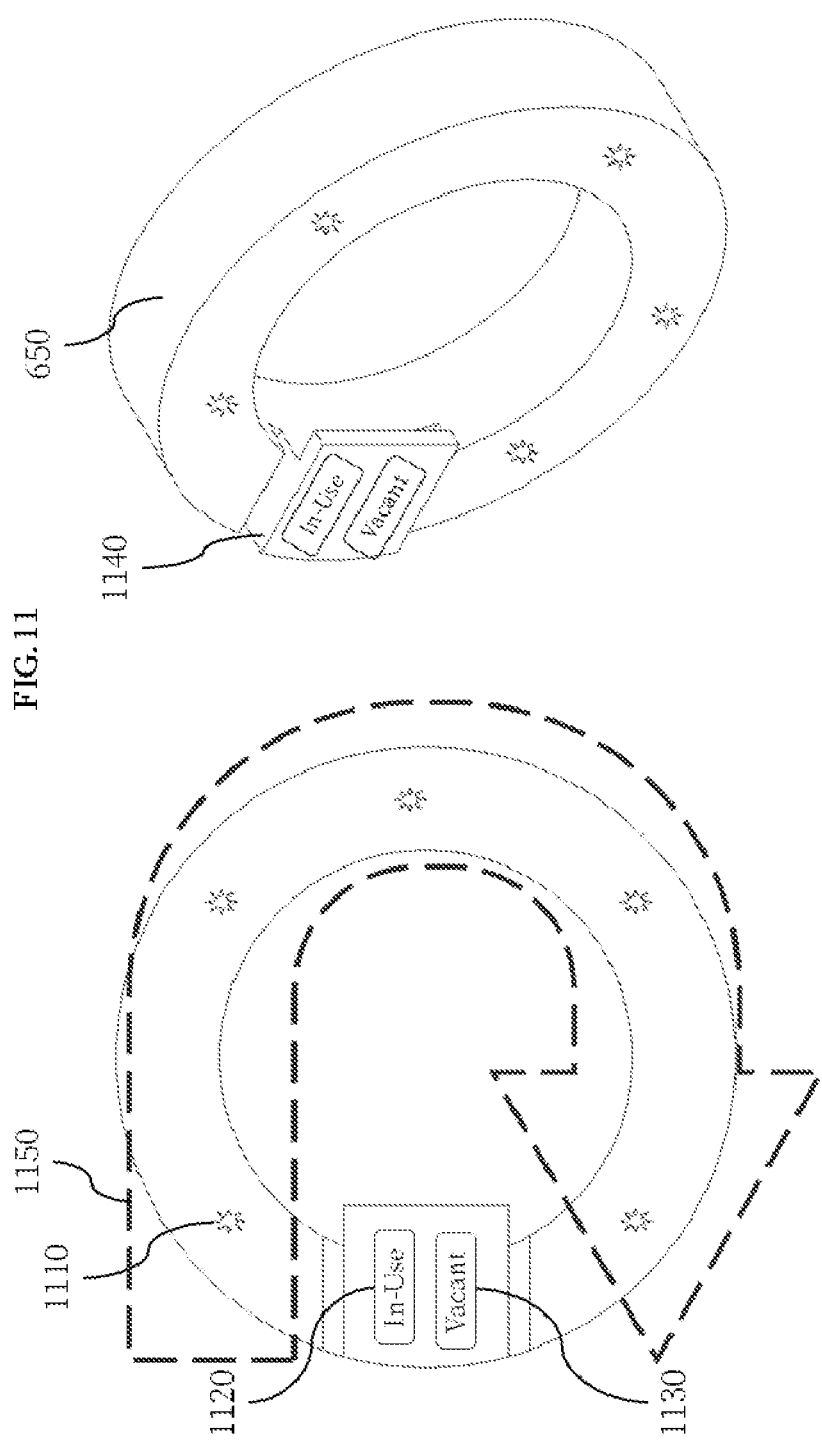
FIG. 11 is an illustration of example components of a door access control system in accordance with this disclosure.

FIG. 11 depicts an example door access control method for a low priority side of a door. In some embodiments, system 650 of FIG. 6 can comprise a detection unit, a control unit, an interaction unit, and an execution unit. In one aspect, the detection unit can comprise multiple generators and detectors 1110. In another aspect, the interaction unit can comprise an "In-Use" display 1120, and a "Vacant" display 1130. In a further aspect, display 1120 and display 1130 can comprise lights to indicate respective status. In still further aspects, the execution unit can comprise a mechanical system 1140 for manual control or override in abnormal cases.

In some embodiments, mechanical system 1140 can comprise handles, a keyhole, or a screwdriver hole. In an abnormal event (i.e., a malfunction, power outage, etc.), a user can easily unlock the door with one hand, a screwdriver, or tool.

In further examples, a user can control a door to close with movement 1150 (indicated by the dotted arrow in FIG. 11). In another embodiment, if the door is not locked from the high priority side, the "Vacant" display 1130 can be illuminated, and the light associated with the "In-Use" display 1120 can be off. In another aspect, if the door is locked from the high priority side, the "In-Use" display 1120 can be lit up, and the "Vacant" display 1130 can be turned off. In a further aspect, if the door is not locked from the high priority side, one can request that the door open by using a reverse movement in the opposite direction of movement 1150. System 650 can also output one or more signals to another door open/close device, and/or receive feedback from another door open/close device.

Figure 12:
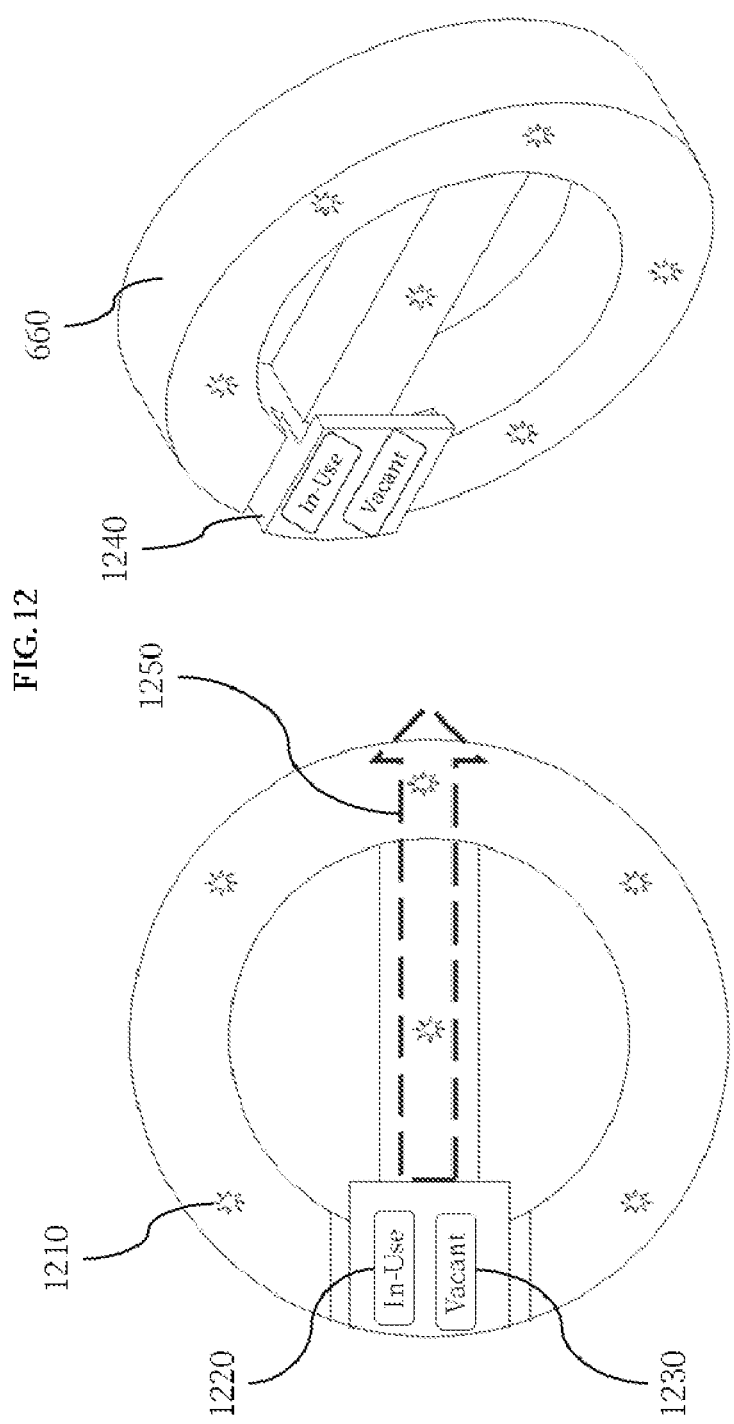
FIG. 12 is an illustration of example components of a door access control system in accordance with this disclosure.

FIG. 12 depicts an example door access control method for a high priority side of a door. In some embodiments, system 660 of FIG. 6 can comprise a detection unit, a control unit, an interaction unit, and an execution unit. In one aspect, detection unit can comprise multiple generators and detectors 1210. In another aspect, interaction unit can comprise an "In-Use" display 1220, and a "Vacant" display 1230. In some examples, display 1220 and display 1230 can comprise lights to indicate respective status. In further examples, the execution unit can comprise mechanical system 1240 for manual control in abnormal cases.

In some embodiments, mechanical system 1240 can comprise a handle, a keyhole, or a screwdriver hole, for example. In case of abnormal conditions (e.g., power outage or malfunction), a user can easily unlock the door with one hand, a screwdriver, or a tool.

In one aspect, a user can request that the door open or close in the same way as described in FIG. 11. In another embodiment, a user can request a door to lock with movement 1250. In a further embodiment, if the door is not locked from the high priority side, the "Vacant" display 1230 can illuminate, and the "In-Use" display 1220 light can be off. In other examples, if the door is locked from the high priority side, the "In-Use" display 1220 can be illuminated, and the "Vacant" display 1230 can be turned off. In further embodiments, a user can request a door to unlock with a movement in the opposite direction of movement 1250. In another aspect, a user can request a door to unlock and open with a movement in a direction opposite movement 1250. In another example, a user can request that a door unlock, followed by a door open and an electric valve operation, with a movement in the opposite direction of movement 1250. For example, the electric valve operation can control a toilet flushing. System 660 can also output one or more signals to another door open/close device, and/or receive feedback from another door open/close device.

Figure 13:
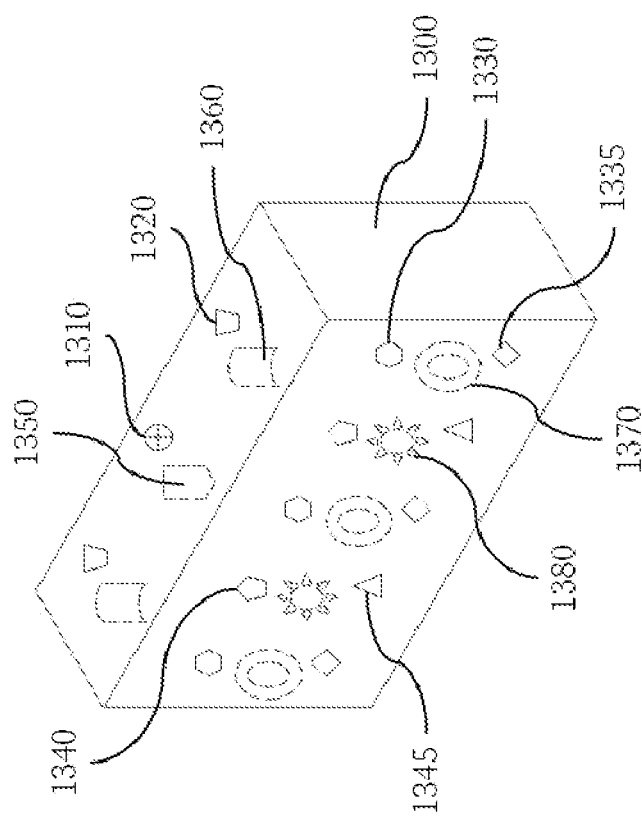
FIG. 13 is an illustration of example components of a door access control system in accordance with this disclosure.

FIG. 13 depicts a diagram of an example detection unit. In some examples, detection unit 1300 can comprise multiple generators and detectors 1310-1380. In one aspect, generators and detectors 1310-1380 can be arrayed in any combination on one or multiple faces of detection unit 1300. For example, detection unit 1300 can comprise heat-sensitive detector 1310 and electromagnetic detector 1320 on one face. In other examples, detection unit 1300 can comprise infrared light generator 1330, infrared light detector 1335, sound wave generator 1340, and sound wave detector 1345 on another face. In further examples, detection area 1350, detection area 1360, detection area 1370, and detection area 1380 can be located at a distance of approximately 100 mm from heat-sensitive detector 1310, electromagnetic detector 1320, infrared light detector 1335, and sound wave detector 1345, respectively. Such combinations of multiple detection areas can correspond with different requesting movements and/or poses.

Figure 14:
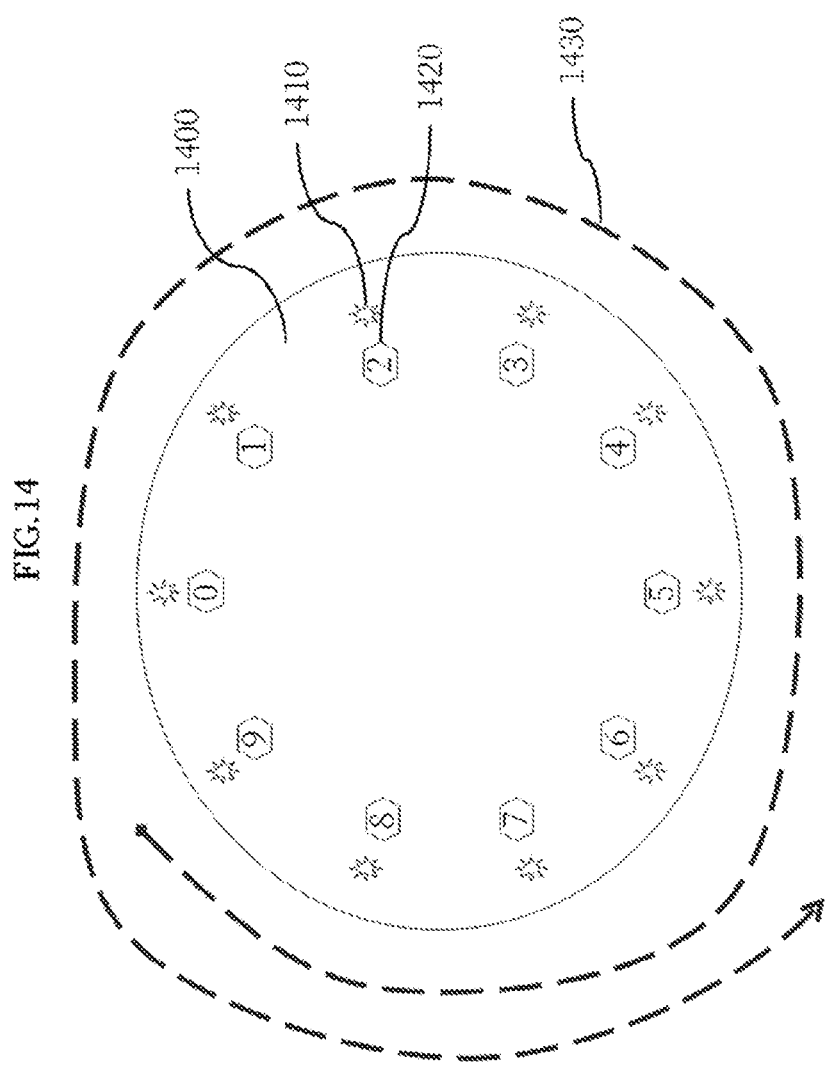
FIG. 14 is an illustration of example components of a door access control system in accordance with this disclosure.

FIG. 14 depicts an example of a door access control method. In one aspect, detection unit 1400 can comprise multiple detectors 1410, each corresponding to a displayed number or symbol 1420. In another aspect, numbers and symbols 1420 can comprise lights for illuminating to indicate their respective status. In a further aspect, a user can program a customized control move 1430 that starts from a location corresponding to display number 9 and moves past the display numbers 8, 7, 6, 5, 4, 3, 2, 1, 0, 9, 8, 7 in sequence, and ending at number 6. In another aspect, the user can then program detection unit 1400 to associate the customized control move 1430 with one or more requests (e.g., open/close door, lock/unlock door, etc.).

Figure 15:
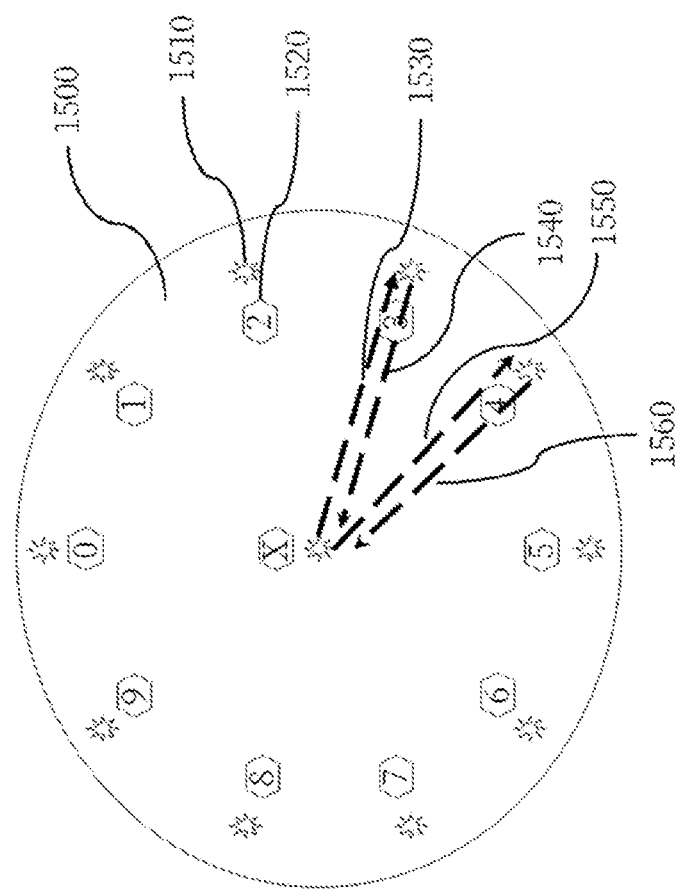
FIG. 15 is an illustration of example components of a door access control system in accordance with this disclosure.

FIG. 15 depicts an example of another door access control method. In one aspect, detection unit 1500 can comprise multiple detectors 1510, each corresponding to a displayed number or symbol 1520. In another aspect, numbers and symbols 1520 can comprise lights for illuminating to indicate their respective status. In a further embodiment, a user can program a movement such as inputting the number 34 by motioning over number 3 followed by a movement to the center of detection unit 1500, followed by motioning over number 4. In another example, these inputs or movements can be achieved with movement 1530 (as shown in FIG. 15) followed by movement 1540 for inputting the number 3, and then movement 1550 followed by movement 1560 for inputting the number 4. Of course these are only illustrative examples and any suitable or intuitive movement for programming a movement/sequence can be used.

Figure 16:
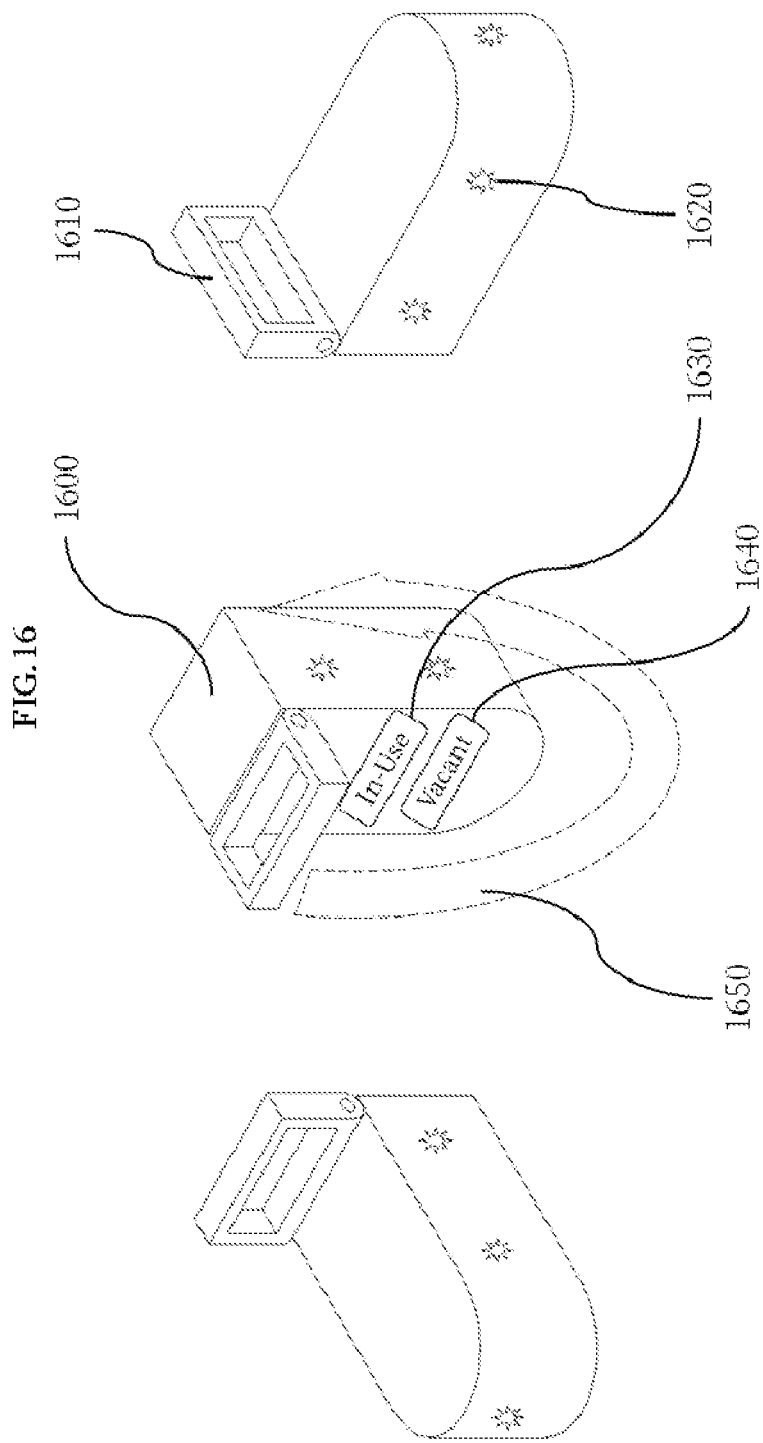
FIG. 16 is an illustration of example components of a door access control system in accordance with this disclosure.

FIG. 16 depicts another example of a door access control method. In one aspect, system 1600 can comprise a detection unit, a control unit, an interaction unit, and an execution unit. In some examples, interaction unit can comprise an "In-Use" display 1630 and a "Vacant" display 1640. In further examples, display 1630 and display 1640 can comprise lights for indicating their respective status. In another aspect, detection unit can comprise multiple detectors 1620. In a further aspect, a user can control a door lock with movement 1650 associated with a locking request. In another example, a user can control a door lock by performing a movement in the opposite direction of movement 1650 for requesting an unlock. In still further examples, the execution unit can comprise a manual handle 1610.

Figure 17:
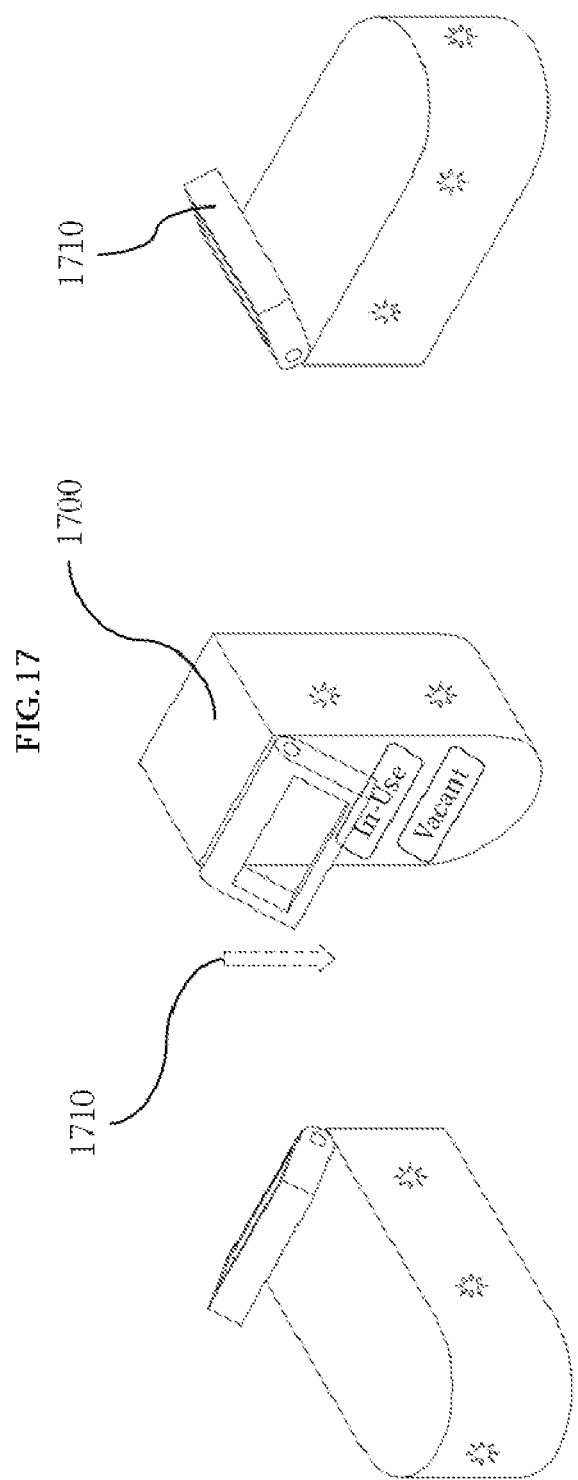
FIG. 17 is an illustration of example components of a door access control system in accordance with this disclosure.

FIG. 17 depicts another example of a door access control method. In one aspect, a user can manually control a door lock with a pressing downward movement 1710 for unlocking.

Figure 18:
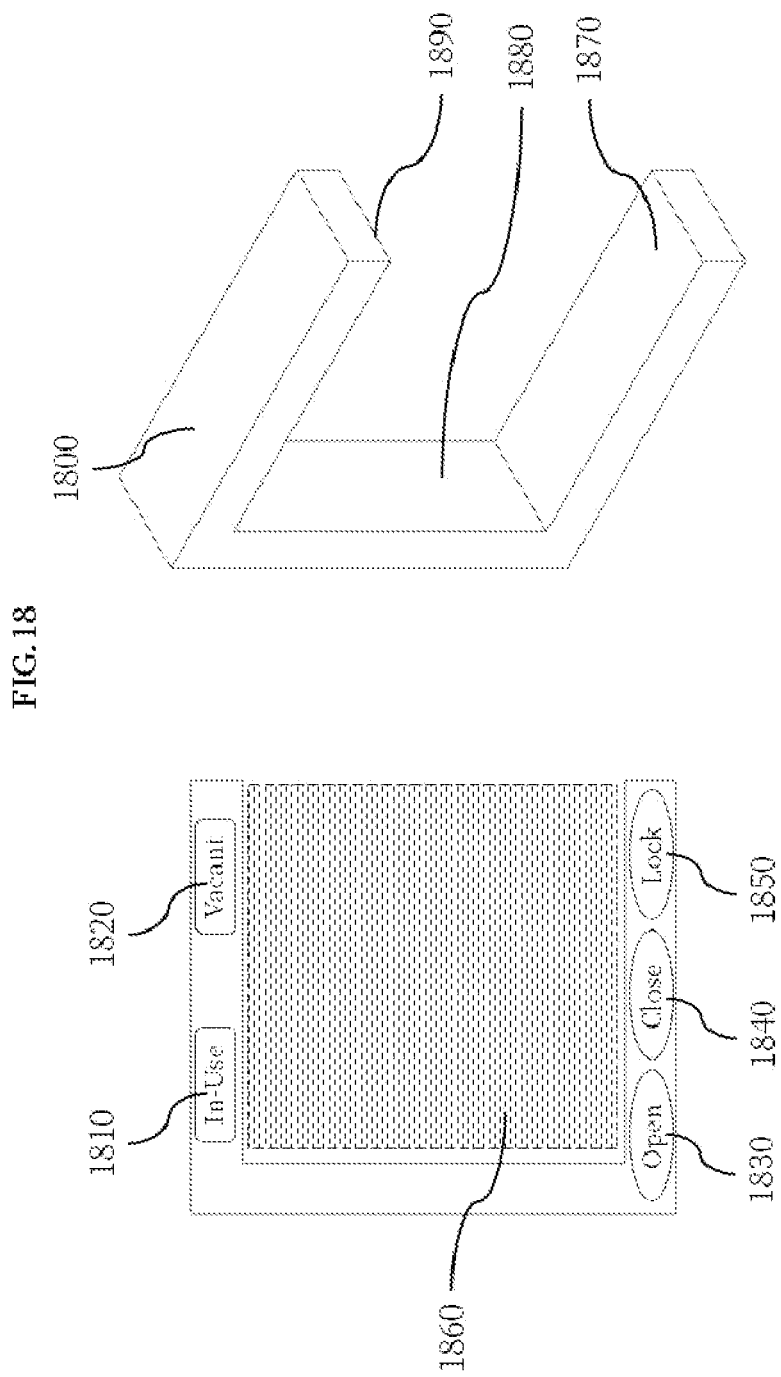
FIG. 18 is an illustration of example components of a door access control system in accordance with this disclosure.

FIG. 18 depicts an example of a door access management system. In one aspect, the system 1800 can comprise a detection unit, a control unit, an interaction unit, and an execution unit. In some examples, interaction unit can comprise an "In-Use" display 1810, a "Vacant" display 1820, an "Open" button 1830, a "Close" button 1840, and a "Lock" button 1850. The "Open" button 1830 can unlock the door and open the door. In another illustrative example, display 1810 and display 1820 can comprise an interface, a screen, and/or lights to indicate respective status. In another example, detection unit can comprise multiple types of detectors. In a further example, detectors can be embedded in face 1870, face 1880, and/or face 1890, defining a detecting space 1860. In some embodiments, detection unit can detect material spectrum, geometry, movement, poses, electromagnetic, thermal property, vibration, color, texture, or other properties of a target within the three-dimensional space 1860.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, in a different order, or a different timeframe. The order of steps presented is only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as illustrative only, with a true scope and spirit of the disclosure being indicated by the following claims.

What is claimed is:

1. A non-contact system for managing door access, comprising:
   a first array of sensors located on a first side of a door that detects a first movement, the first side of the door associated with a first priority and the first movement associated with a first command;
   a second array of sensors located on a second side of the door that detects a second movement, the second side of the door associated with a second priority that is lower than the first priority and the second movement associated with a second command;
   a processor that rejects the second command based on the first command being associated with a higher priority than the second command; and
   a door lock mechanism that performs the first command transmitted by the processor.

2. The system of claim 1, wherein the first array of sensors is associated with a high priority side of the door and a second array of sensors is associated with a low priority side of the door.

3. The system of claim 2, wherein a first request associated with a first movement corresponding to a door lock command is detected proximate the first array of sensors and, based on detection of the first movement, a second request associated with a second movement corresponding to a door unlock command detected proximate the second array of sensors is rejected.

4. The system of claim 1, wherein the first array of sensors includes one or more laser generators, laser detectors, lenses, light sensitive materials, heat-sensitive materials, acoustic generators, electromagnetic sensitive materials, or sound wave receivers.

5. The system of claim 1, the first array of sensors being arranged around a substantially annular path.

6. The system of claim 5, the first array of sensors being further arranged along a lateral path spanning across a void in the annular path.

7. The system of claim 1, wherein the first array of sensors is further associated with one or more displays, each display including one or more lights for indicating a status of the non-contact system.

8. A non-contact method for managing door access, the method including:
   providing a first array of sensors on a first side of a door, the first side of the door associated with a first priority;
   providing a second array of sensors on a second side of the door, the second side of the door associated with a second priority that is lower than the first priority;
   detecting, by the first array of sensors, a first movement or pose;
   determining that the first movement or pose is associated with a first command;
   executing the first command;
   detecting, by the second array of sensors, a second movement or pose;
   determining that the second movement or pose is associated with a second command;
   rejecting the second command based on the first command being associated with a higher priority than the second command.

9. The method of claim 8, wherein the first command is a door lock command and the second command is a door unlock command.

10. The method of claim 8, wherein the first command is a door close command and the second command is a door open command.

11. The method of claim 8, wherein the first and second arrays of sensors include one or more laser generators, laser detectors, lenses, light sensitive materials, heat-sensitive materials, acoustic generators, electromagnetic sensitive materials, or sound wave receivers.

12. The method of claim 8, wherein the first and second arrays of sensors are arranged in a substantially annular shape.

13. The method of claim 12, wherein each of the sensors in the first and second arrays are associated with a number of symbol displayed proximate the sensor.

14. A non-contact method for managing door access, the method including:
   receiving, from a first array of sensors located on a first side of a door, one or more signals indicative of a movement or pose by an individual in proximity to the first side of the door, the first array of sensors being arranged around a substantially annular path;
   interpreting the one or more signals by comparing them to a database of stored signals, each associated with one or more commands;
   determining that the one or more signals correspond to one or more stored signals; and
   performing one or more commands associated with the one or more stored signals.

15. The method of claim 14, wherein the first array of sensors is associated with a high priority side of a door and a second array of sensors located on a second side of the door is associated with a low priority side of the door.

16. The method of claim 15, further comprising:
   receiving a first request associated with a first movement detected proximate the first array or sensors, the first movement corresponding to a door lock command;
   performing a door lock command in response to the first request;
   receiving a second request associated with a second movement detected proximate the second array of sensors, the second movement corresponding to a door unlock command; and
   rejecting the second request based on the prior detection of the first movement proximate the first array of sensors.

17. The method of claim 14, wherein the first array of sensors includes one or more laser generators, laser detectors, lenses, light sensitive materials, heat-sensitive materials, acoustic generators, electromagnetic sensitive materials, or sound wave receivers.

18. The method of claim 14, wherein the one or more commands includes at least one of locking a door, unlocking the door, opening the door, and closing the door.

19. The method of claim 14, the first array of sensors being further arranged along a lateral path spanning across a void in the annular path.

20. The method of claim 14, wherein the first array of sensors is further associated with a plurality of lights, each light associated with at least one status of the door.

\* \* \* \* \*